Sept. 4, 1956 W. W. HAMILL 2,761,669
DIFFERENTIAL SPEED RESPONSIVE DEVICE
Filed July 15, 1954 4 Sheets-Sheet 1
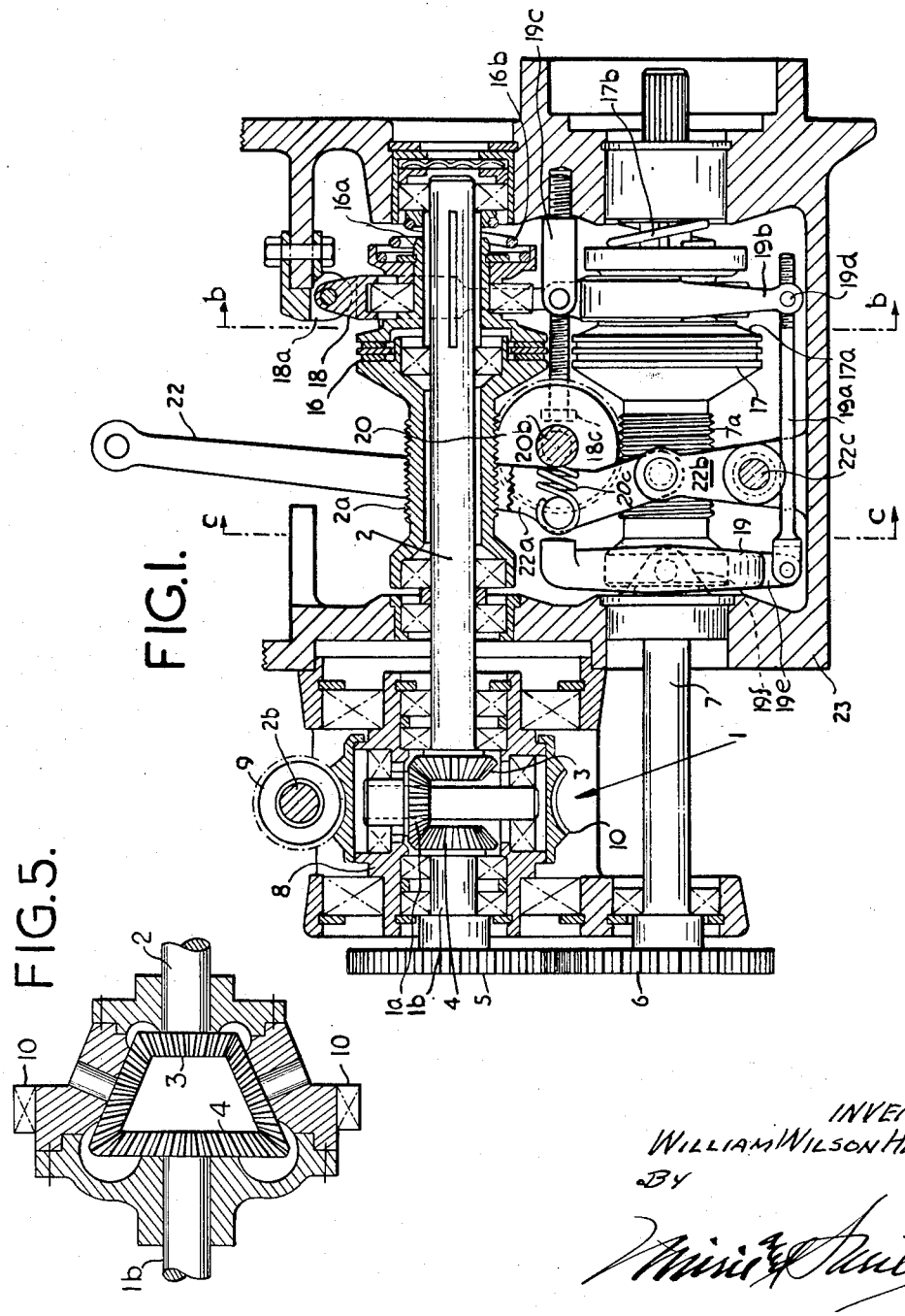
INVENTOR
WILLIAM WILSON HAMILL Sept. 4, 1956 W. W. HAMILL 2,761,669
DIFFERENTIAL SPEED RESPONSIVE DEVICE
Filed July 15, 1954 4 Sheets-Sheet 2
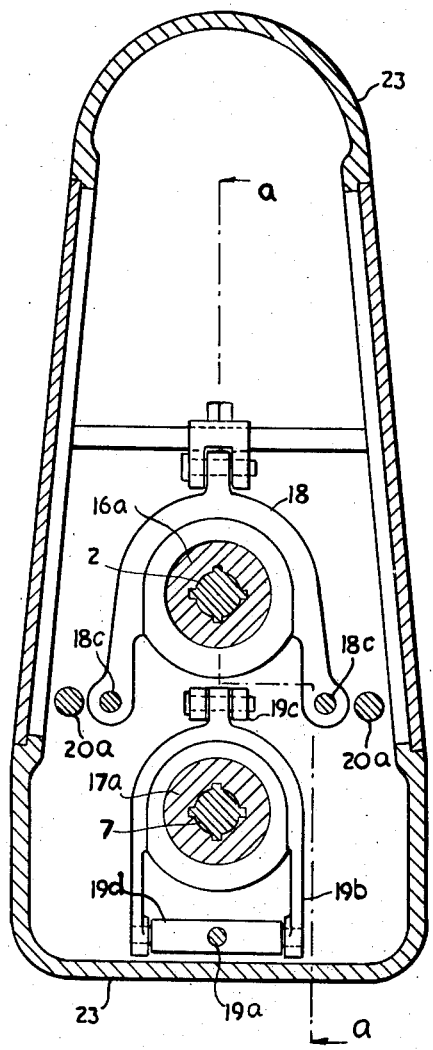
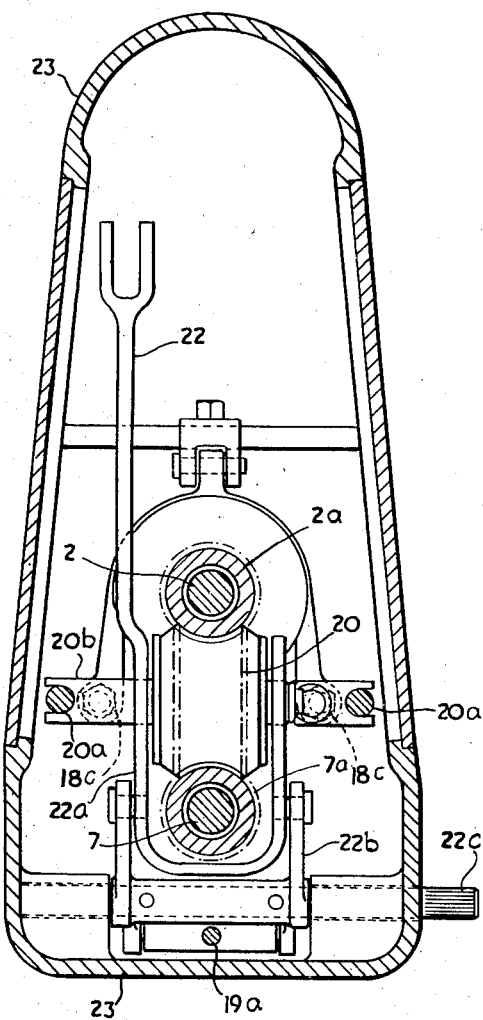
INVENTOR
WILLIAM WILSON HAMILL
BY Sept. 4, 1956 W. W. HAMILL 2,761,669
DIFFERENTIAL SPEED RESPONSIVE DEVICE
Filed July 15, 1954 4 Sheets-Sheet 3

INVENTOR
WILLIAM WILSON HAMILL
BY

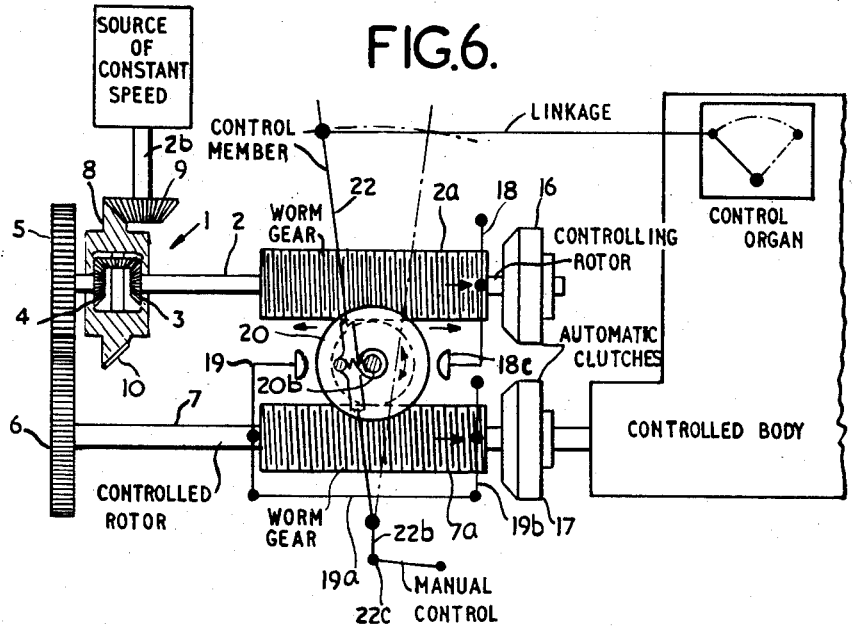

United States Patent Office 2,761,669
Patented Sept. 4, 1956

2,761,669

DIFFERENTIAL SPEED RESPONSIVE DEVICE

William Wilson Hamill, Wednesfield, Wolverhampton, England

Application July 15, 1954, Serial No. 443,645

8 Claims. (Cl. 264—9)

This application is a continuation in part of application Serial No. 161,318, filed May 11, 1950, and now abandoned, and has reference to a differential speed responsive device for regulating or governing the speed of rotation of a prime mover (hereinafter referred to as the controlled body), the said device being of the kind such as described in the specification of my Letters Patent No. 2,622,532 including two rotors of which one is driven by and revolves at the speed of the controlled body (or at a speed having a direct relation to the said body speed), whereas the other is rotated by a source of constant speed, the arrangement being such that, as and when a speed differential arises between the two rotors due to a departure of the speed of the controlled body from a predetermined value, a member which is floatably mounted between and is driven by the said rotors, and which controls the body speed, is moved in the direction which restores the said speed to the said predetermined value.

The principal object of the present invention is to improve the sensitivity of the speed governor particularly in respect of fluctuations in cyclic angular velocity of the controlled body when, for example, the said body consists of an internal combustion engine of the reciprocating piston type.

A further object of the invention is to provide a speed governor which is of compact construction and low in weight and is capable of being assembled to or used in conjunction with a controlled body of any known type.

Another object of the invention is to provide a speed governor which operates efficiently and accurately irrespectively of the manner in which it is fitted relatively to the controlled body; that is to say, irrespectively of whether it is fitted in an upright, inverted, inclined or any other position.

Still another object of the invention is to ensure that, in the event of the cessation of drive from the source of constant speed, or the failure of the governor or of the drive transmitting mechanism between the controlled body and the governor, the controlled body is either stopped or its speed is reduced to a predetermined minimum value, automatically.

A still further object of the invention is to enable the speed adjusting control of the governor on the controlled body, to be interrupted automatically should the body hesitate to respond to the said control and to enable the said control to be re-instated automatically as and when the desired response takes place.

This and other specific objects and advantages of the invention will appear from the description hereinafter given of a governor for controlling the speed of rotation of the crank shaft of an internal combustion engine or similar controlled body. This description is to be read in conjunction with the accompanying drawings which illustrate two convenient ways of carrying out the invention. In the said drawings:

Figure 1 is a sectional elevation, taken along the line a—a of Fig. 2, of a typical speed governor constructed in accordance with the invention, part of the casing of the governor being broken away.

Figure 2 is a section taken along the line b—b of Figure 1.

Figure 3 is a section taken along the line c—c of Figure 1.

Figure 5 is a sectional elevation of an alternative or modified construction of differential gear for use in the governor shown in Figures 1–3.

Figure 6 is a schematic view of the governor shown in Figure 1.

Figure 7 is a schematic view of a modified or alternative arrangement of the component parts of the governor shown in Figure 1.

Figure 4:
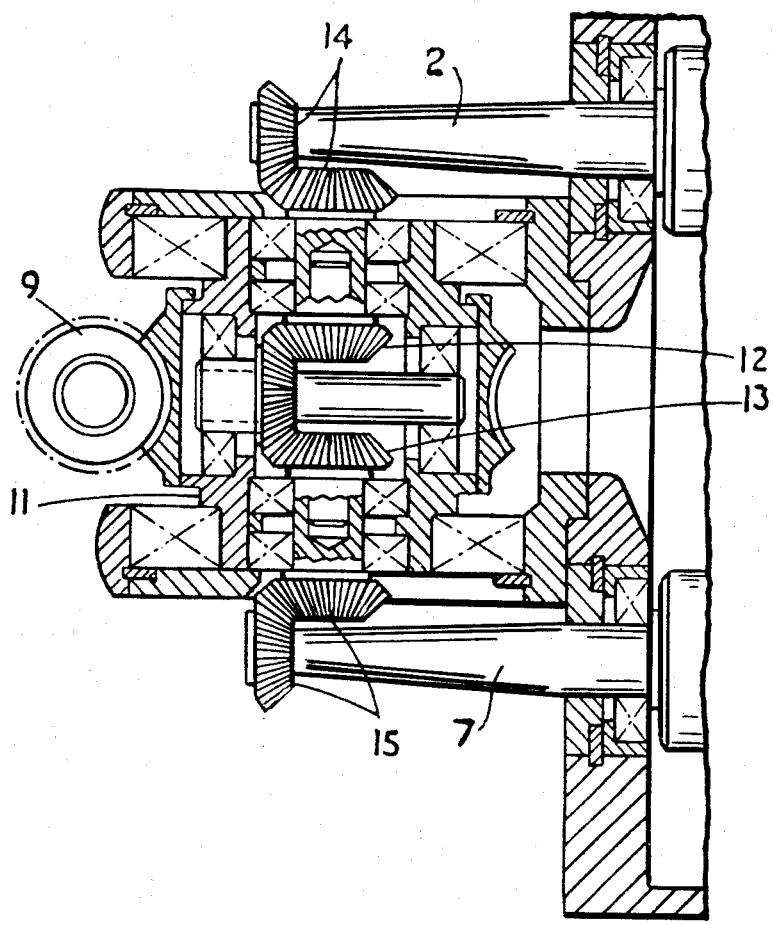
Figure 4 is a sectional elevation of a portion of a modified or alternative form of governor constructed in accordance with the invention.

In the governor illustrated in Figs. 1–3 and Figure 6 of the drawings, 2 indicates the controlling rotor which is driven at a speed the value of which varies by an amount equal or proportional to any difference which may exist between the speed of a source of constant speed (such as the rotor 2b of a constant speed electirc motor) and the speed of the controlled rotor 7. The speed of the said constant source must be such that the controlling rotor always rotates in one and the same direction which is opposite to the direction of rotation of the controlled rotor and, when the controlled rotor is rotating at uniform speed, that the controlling rotor rotates at the same speed as the controlled rotor; the controlled rotor is adapted to be rotated by the crankshaft of an internal combustion engine or the driving shaft of any other controlled body the speed of which it is desired to govern, either at the same speed as the said driving shaft or at a speed having a direct relation to the said shaft speed; 2a is a worm mounted around the controlling rotor and drivably connected to the latter through a clutch 16 of which the slidable member 16a is splined to the said rotor and is loaded by a spring 16b; 7a is a worm mounted around the controlled rotor 7 and drivably connected to the latter through a clutch 17 of which the slidable member 17a is splined to the said controlled rotor and is loaded by a spring 17b; 20 is a worm wheel disposed between and meshing simultaneously with the worms 2a, 7a, the said wheel being journalled around an axle 20b which is located at right angles to the rotors 2, 7 and is provided with forked ends (see Fig. 3) which make sliding engagement respectively with guide rods 20a secured within the casing 23 of the governor in parallel relationship to and on opposite sides of the rotors 2, 7 so that the worm wheel is capable of being displaced bodily lengthwise of the worms 2a, 7a; and 22 is a control member in the form of a lever having a U-shaped lower portion 22a of which the limbs are journalled about fulcra on a bifurcated link 22b fast with a spindle 22c which extends transversely of and is rotatable within the base of the casing 23.

The said spindle 22c projects to the exterior of the casing and a handle (not shown) is adapted to be fixed to its projecting end so that it is adapted for manual rotation about its axis within the casing; the upper free end of the control member 22 is adapted to be coupled by linkage (not shown in Figures 1–3) to the control organ (for example, the throttle or fuel pump control bar of an internal combustion engine) of the controlled body and the limbs of the portion 22a are held in abutment with the axle 20b by a tension spring 20c connected to and between the said control member and axle so that the control member is constrained to follow the movement of the axle lengthwise of the worms 2a, 7a; hence, the setting of the control member is adapted to be altered, with consequent adjustment of the speed at which the driving shaft of the controlled body is rotated either at will to determine a minimum speed by manual adjustment of the spindle 22c which swings the control member about its points of contact with the axle 20b or automatically due to the action of the rotor shafts so that the said driving shaft is driven at a controlled speed determined by the speed of the source of constant speed by movement of the said axle 20b lengthwise of the said worms which swings the control member about its fulcra on the link 22b.

A bevel type differential gear 1 is assembled to the casing 23 and the driving shaft 2b of the source of constant speed, is provided with a worm 9 which meshes with a worm wheel 10 disposed around and fast with the cage 8 of the said gear, so that, the shaft 2b rotates the cage at a constant speed.

The planetary pinion 1a of the said gear meshes permanently with two balancing pinions 3, 4, the pinion 3 being fast with one end of the controlling rotor 2 whereas the other balancing pinion is fast with one end of an intermediate shaft 1b which is connected to the controlled rotor 7 through a pair of identical meshing spur wheels 5, 6 fast with the shaft 1b and rotor 7 respectively.

The end of the controlled rotor 7 opposite to the spur wheel 6, projects to the exterior of the casing 23 where it is adapted to be connected to the driving shaft of the controlled body, either directly so that it is rotated at the same speed as the said driving shaft, or through the intermediary of a pump or other mechanism driven by the controlled body so that it is rotated at speed which has a direct relation to the speed of the said driving shaft.

The clutch member 16a is engaged by a forked lever 18 which is pivoted to and is suspended from a lug 18a secured to the casing 23, and the lower and free end of each arm of the said lever carries an axially adjustable set screw 18c which is located in the plane of movement of and projects towards the axle 20b.

Similarly the clutch member 17a is engaged by a forked lever 19b which is pivoted to and is suspended from a bracket 19c fixed in an end wall of the said casing, a rotatable spindle 19d is mounted between the lower and free ends of the arms of the lever 19b and is coupled by an axially adjustable tie rod 19a to a lug 19e on the bottom of a U-shaped lever 19 which is pivotally assembled, intermediate its ends, upon brackets 19f fixed upon the other end wall of the casing 23 and on opposite sides of the worm 7a; the upper ends of the arms of the lever 19 are located in the plane of movement of the axle 20b and on the opposite side of the said axle to the set screws 18c.

By manual adjustment of the spindle 22c, the control member is set so that, when the controlled body has been started up, its driving shaft will at no time rotate at a speed less than a predetermined minimum which may be of any desired value less than the controlled speed and to which the shaft speed tends to return during the whole time that the controlled body is under the control of the governor.

Hence, should the superimposed controlling effect of the governor be removed as a consequence of the source of constant speed being rendered inoperative (for example by the opening of the switch whereby it is connected to a source of electric current supply) for any reason such as to enable the controlled body to be tested or serviced, then the speed of the controlled body (that is to say, the speed at which the driving shaft of the body rotates) automatically falls to the said predetermined minimum.

If, after the controlled body has been started up, the spindle 22c is returned to an initial zero positon, then it follows that the controlled body will stop automatically should the superimposed speed controlling effect of the governor be removed.

However, provided that the cage 8 is being rotated by the source of constant speed, then the controlling rotor 2 is rotated at the same speed as, but in the opposite direction to, the controlled rotor 7. Under such conditions, the worm wheel is rotated about its axle 20b by the worms 2a, 7a, the said axle floats mid-way between the set screws 18c and the upper ends of the arms of the lever 19, and the control member 22 is positioned so that the driving shaft of the controlled body, and therefore, the controlled rotor 7, rotate at a controlled uniform angular velocity or at controlled relative uniform angular velocities. Provided that such conditions of uniform angular velocity are maintained, then the interposed differential gear 1 has no dividing influence and the speed of the controlling and controlled rotors remain equal and constant and the axle 20b remains stationary.

However, should the speed of the driving shaft of the controlled body depart from the controlled value, a corresponding variation is imposed upon the speed of the controlled rotor thereby creating a speed differential between the rotors 2 and 7 and the worms 2a and 7a; as a result, the worm wheel 20 is caused to move bodily lengthwise of the said worms; this bodily movement of the worm wheel is transferred through its axle 20b to the control member 22, and the latter, acting through the control organ of the controlled body, restores the speed of the driving shaft of the said controlled body to the controlled value.

Postulating that, should the speed of either one of the rotors 2 or 7 be changed relatively to that of the other rotor, the action of the differential gear would be to add to the speed of the faster moving rotor what has been taken away from the speed of the slower moving rotor, or, to take away from the speed of the slower moving rotor what has been added to the speed of the faster moving rotor; then, it follows that the action of the said differential gear in the event of any change of speed of the controlled rotor 7, will be to augment or magnify the speed differential between the shafts 2 and 7 with a resulting quicker and larger bodily movement of the worm wheel 20 and therefore of the control member 22 and of the throttle or other control organ of the controlled body, to restore and maintain the controlled uniform angular speed of the controlled body.

Therefore, the rate at which an increase or decrease in the speed of the controlled rotor is corrected, is also augmented. Hence, any speed differential created between the two rotors 2, 7 by an increase in the speed of the controlled body, has two effects; first, it causes a displacement of the worm wheel 20 and axle 20b lengthwise of the worms 2a and 7a so as to turn the control member 22 in the direction which causes the control organ to reduce the speed of the driving shaft of the controlled body; secondly, but simultaneously, the increase in speed imparted to the balancing pinion 4 through the spur wheels 5, 6 causes the differential gear to rotate the balancing pinion 3 at a reduced speed, thereby magnifying the speed differential so as to augment the rate of displacement of the wheel 20 and control member 22, with a consequent quicker return of the driving shaft of the controlled body to the controlled speed.

Similarly, if the angular velocity of the controlled rotor decreases, the control member 22 is displaced rapidly in the direction which returns the said driving shaft to the controlled speed in a minimum time. In addition to such changes in the speed of the driving shaft which result, for example, from variations in the load on the controlled body, and when the said body consists of an engine of the multi-cylinder, reciprocating piston type and the driving shaft consists of a piston-driven crankshaft, the angular velocity of the crankshaft also varies several times during each revolution, consequent on the character of movement associated with crank and connecting rod action; such cyclic variations are also imparted to the controlled rotor and to the differential gear 1 so that, during each revolution of the crankshaft, the speed of the controlling rotor and its rate of change of speed are constantly undergoing small variations; hence, during each revolution of the said crankshaft the worm wheel 20 is constantly moving or trepidating through small distances backwards and forwards lengthwise of the worms 2a and 7a the movements being transmitted through the control member 22 and the control organ of the engine, thereby tending to smooth out the said cyclic variations of speed and minimising hunting in the controlled body.

Should the controlled body, for any reason, fail to respond immediately to any displacements of the control member 22 which are initiated by a speed differential between the rotors 2 and 7, then the axle of the worm wheel continues to travel lengthwise of the said rotors, and if the axle travels beyond a predetermined limit in either direction, it will impact and displace either the set screws 18c or the upper ends of the arms of the lever 19 with the result that the clutch 16 or the clutch 17 is disengaged and drive to the corresponding worm 2a or 7a is interrupted as also is the controlling effect of the governor on the controlled body.

Nevertheless, the travel of the said axle has taken the control member 22 to a position wherein it tends to restore the driving shaft of the controlled body to the controlled speed so that, as soon as the said body does respond, the worm wheel 20 and the axle 20b are returned towards their initial floating positions mid-way between the set screws 18c and lever 19, by a variation in speed of the worm which has remained in driving connection, through the corresponding clutch, with the rotor around which it is mounted. Immediately the axle commences the said return movement, the disengaged clutch is re-engaged by its loading spring 16b or 17b and the governor again resumes control over the controlled body. In Figure 1, the worm wheel 20 and the axle 20b are shown at the predetermined limit of travel to the right and the said axle is about to contact the set screws 18c and should the worm wheel 20 pass beyond the said limit of travel to the right, its axle 20b will impact and displace the set screws 18c to swing the lever 18 in the direction which disengages the clutch 16 against the action of the spring 16b; likewise, should the worm wheel pass beyond its limit of travel in the opposite direction, the axle 20b would impact the arms of the lever 19 to swing the said lever about its pivots and, acting through the link 19a, swing the lever 19b in the direction which disengages the clutch 17 against the action of the spring 17b.

By mounting the axle 20b on the guide rods 20a, means are provided for positively preventing the worm wheel becoming misaligned relatively to, or being displaced from between, the worms 2a, 7a; consequently, the governor need not be assembled to an engine or other controlled body only in the upright position shown in Figs. 1–3 but may be fitted in an inverted, inclined or any other position.

In the modified governor shown in Fig. 4, the axis of rotation of the cage 11 of the differential gear is at right angles to that of the controlling and controlled rotors 2, 7 instead of being in line with the axis of the controlling shaft 2 as in the arrangement shown in Figs. 1–3, and the two balancing pinions 12, 13 are connected respectively to the said rotors by pairs of bevel wheels 14, 15.

It is to be understood that the two alternative arrangements of governor described above and shown in the drawings are illustrations of the invention only and that various modifications and alterations may be made without departing beyond the scope of the invention as defined by the following claims. Thus, suitable provision, such as a free wheel, ratchet and pawl, or other one way device may be incorporated in the governor to ensure that the controlling and controlled rotors may be rotated only in the correct direction so that the governor will be inoperative in the event of the reversal of rotation of the controlled body as when starting up, or of a faulty or reverse wiring of the constant speed electric motor which imparts drive to the differential gear.

Also, as shown in Figure 5, by increasing the diameter of the pinion 4 relatively to the diameter of the pinion 3, as indicated by way of example in Figure 5 where the pinion 4 has a diameter equal to twice the diameter of pinion 3, the ratio in which any speed differential between the controlled and controlling shafts is augmented, may be increased to say 2 to 1, 4 to 1, 6 to 1, or even higher; or, as indicated in Figure 7, the differential gear 1 may be accommodated within the gear 6 which will then serve as the cage 8, and drive from the source of constant speed may be imparted to the balance wheel 3 through the meshing bevel gears 9, 10 and a shaft 1c. Such an arrangement renders the governor more compact; however, the arrangement reduces the functional advantages of the governor because the inverse variation in speed imparted to the controlling shaft 2 by a variation in speed of the controlled shaft 7, is not so great as in the arrangement shown in Figures 1 and 6 and, therefore, a corresponding smaller movement is imparted to the control member 22 by any given variation in the speed of the controlled shaft. If the differential gear 1 of Figure 1 is replaced by the differential gear of Figure 5, any variation in the speed of the controlled rotor 7 will cause the speed of the controlling rotor 2 to vary by twice the amount but in the opposite sense; for example, if the speed of the controlled rotor decreases by "$x$" revolutions per minute, the speed of the controlling rotor will increase by "$2x$" revolutions per minute.

It is to be understood that although only one planet wheel 1a is shown in Figure 1, and mentioned in the specific description, in carrying out the invention two or more such wheels will be provided, as is common practice.

Having thus described my invention, what I claim is:

1. A differential speed responsive device for controlling the speed of rotation of a rotary driving mechanism having a speed control organ, comprising a controlling rotor and a controlled rotor each provided with a toothed driving gear and the controlled rotor being drivably connected to the said mechanism, a toothed wheel which meshes simultaneously with both said driving gears and is bodily displaceable relatively to the said rotors when differential speed occurs between the latter, means for transmitting said displacement to the said control organ, and a differential gear driven from a source of constant speed and having two wheels of which one is drivingly connected to the controlling rotor and the other is drivably connected to the controlled rotor.

2. A differential speed responsive device for controlling the speed of rotation of a rotary driving mechanism having a speed controlled organ, comprising a controlling rotor and a controlled rotor each provided with a toothed driving gear, the controlled rotor being drivably connected to the said mechanism, a toothed wheel which meshes simultaneously with both said driving gears and is bodily displaceable relatively to the said rotors when differential speed occurs between the latter, means for transmitting said displacement to the said control organ, a source of constant speed, and a differential gear of which one wheel is connected to the said source and the other two wheels are connected to the controlling rotor and controlled rotor respectively.

3. A differential speed responsive device for controlling the speed of rotation of a rotary driving mechanism having a speed control organ, comprising a controlling rotor and a controlled rotor each provided with a worm, a worm wheel in mesh with both the said worms and bodily displaceable relatively to the rotors when a speed differential occurs between the latter, means for transmitting said slidable motion to the said control organ, a source of constant speed, and a differential gear having a rotatable cage which is drivably connected to the said source and two balancing wheels which are connected to the said controlling rotor and the said controlled rotor respectively, the said controlled rotor also being drivably connected to the controlled mechanism.

4. A differential speed responsive device according to claim 1 in which one of the two differential wheels is fast with a drive transmitting gear which meshes with a second drive transmission gear fast with one of the said rotors, the other of the said two differential wheels being fast with the second of said rotors.

5. A differential speed responsive device according to claim 1 in which one of the two differential wheels is fast with a first drive transmitting gear which meshes with a second drive transmitting gear fast with one of the rotors, and the other of the said differential wheels is fast with a third drive transmitting gear which meshes with a fourth drive transmitting gear fast with the second of the said rotors.

6. A differential speed responsive device for controlling the speed of rotation of a rotating driving mechanism having a control organ, comprising a source of constant speed, a differential gear having a rotatable cage drivably connected to said source of constant speed, a planet wheel and two balancing wheels in mesh with the said planet wheel, a controlling rotor drivably connected to one of the said balancing wheels, a controlled rotor drivably connected to the said mechanism so that it is rotated in the opposite direction of rotation to the controlling rotor and drivingly connected to the second of the said balancing wheels, and a member coupled to the said control organ and rotatable under the simultaneous action of both the said rotors so that it is displaced bodily to actuate the said organ in the event of variation in the speed of rotation of either of said rotors.

7. A differential speed responsive device for controlling the speed of rotation of a rotary driving mechanism having a speed control organ, comprising a source of constant speed, a differential gear having a planet wheel and two balancing wheels in mesh with the said planet wheel, one of the said wheels being drivably connected to the said source, a controlling rotor drivably connected with a second of said wheels, a controlled rotor drivably connected with said mechanism and drivingly connected with the third of the said wheels, said controlling and controlled rotors being connected together by means which is displaced when differential speed occurs between said rotors, and means for transmitting said displacement to the said control organ.

8. A differential speed responsive device according to claim 1, comprising a first clutch for transmitting drive from the controlling rotor to its driving gear, a second clutch for transmitting drive from the controlled rotor to its driving gear, a first actuating member for one of the said clutches being disposed in the path of displacement of the said wheel on one side and in spaced relationship to the wheel, a second actuating member for the other of the said clutches disposed in the path of displacement of and in spaced relationship to the said wheel but located on the opposite side of the wheel to the said first member, whereby wheel displacement in either direction beyond a predetermined distance disengages one or other of the said clutches.

References Cited in the file of this patent

UNITED STATES PATENTS

| | | |
|---|---|---|
| 2,399,685 | McCoy | May 7, 1946 |
| 2,622,532 | Hamill | Dec. 23, 1952 |
| 2,667,344 | Robbins | Jan. 26, 1954 |